United States Patent
Pollard

(10) Patent No.: US 6,843,138 B2
(45) Date of Patent: Jan. 18, 2005

(54) METHOD AND APPARATUS FOR MEASURING AIR FLOW

(75) Inventor: Jeffrey Pollard, Gray, ME (US)

(73) Assignee: Radiodetection Limited, Bristol (GB)

( * ) Notice: Subject to any disclaimer, the term of this patent is extended or adjusted under 35 U.S.C. 154(b) by 33 days.

(21) Appl. No.: 10/324,016

(22) Filed: Dec. 20, 2002

(65) Prior Publication Data

US 2004/0118219 A1 Jun. 24, 2004

(51) Int. Cl.[7] .............................................. G01F 1/37
(52) U.S. Cl. ................................................. 73/861.52
(58) Field of Search .................... 73/861.61, 861.63, 73/861.52; 137/557

(56) References Cited

U.S. PATENT DOCUMENTS

| | | | | |
|---|---|---|---|---|
| 5,533,549 A | * | 7/1996 | Sherman | 137/557 |
| 6,164,142 A | * | 12/2000 | Dimeff | 73/861.61 |
| 6,324,917 B1 | | 12/2001 | Mack et al. | 73/861.52 |

* cited by examiner

*Primary Examiner*—Edward Lefkowitz
*Assistant Examiner*—Jewel Thompson
(74) *Attorney, Agent, or Firm*—Baker & Hostetler LLP

(57) ABSTRACT

A method and apparatus includes a multi-position valve that restricts the air flow when the valve is placed in one position. Pressure tap valves are located are the inlet and outlet ports to measure the pressure differential and thereby determine the airflow rate.

24 Claims, 5 Drawing Sheets

SECTION "A-A"

SECTION "A-A"

SECTION "B-B"

SECTION "C-C"

METHOD AND APPARATUS FOR MEASURING AIR FLOW

FIELD OF THE INVENTION

The present invention relates generally to a method and apparatus for measuring airflow. More particularly, the present invention relates to restricting airflow in a pressurized line and determining the pressure differential to thereby determine the air flow rate then provide a unrestricted airflow path within the same device.

BACKGROUND OF THE INVENTION

Cables, such as telephone lines, that are placed below the ground are usually enclosed in a sheath and internally pressurized with dry air. Dry Air is feed into air pipe and is then feed at predetermined locations along the cable into the sheath. By pressurizing the sheath in which the cables lie, it aids in preventing water from shorting pairs of the wires that make up the cables. Unfortunately, there are times when the sheath or air pipe are penetrated, either by chemical degradation (electrolysis), mechanical stresses, or similar phenomena. Penetrations in the sheath could permit water to seep inside should the internal pressure fall below the head pressure of the water above the cable sheath. Water, then causes a degradation of any internal insulation. After the insulation is exposed, water then makes it way into the bare cable. This, in turn, causes the wire to short as well as degradation of the signals carried by the cable. Leaks in the Air Pipe also effect the air pressure level within the cable sheath also. If the pressure drops low enough within the air pipe, water can seep inside the cable sheath.

Discovering and repairing this damage can cost the provider substantial sums of money. One of the reasons is that it is sometimes necessary to excavate in several points. Another reason is that the it might be necessary to unearth hundreds of cubic yards of earth due to the impossibility of identifying the exact location of the leak.

Another technique is to introduce a detectable tracer gas into the cable and let it permeate to the surface. A mass spectrometer is then used to detect the tracer gas. The problem with the spectrometers is that their operation depends upon separation of the tracer gas in a vacuum by imparting an electrical charge to the gas sample containing the tracer helium. The sample is pushed through a magnetic field, and the hydrogen ions collected from the results. The electronics, in such a device, include a supply of high voltage and the vacuum system. All of these components tend to make the helium detector bulky, complicated and expensive. With this type of equipment, it is difficult to operate the detector in areas where access to such heavy equipment can be difficult.

An additional problem with the prior art was the ability to accurately detect the tracer gas. In many of the prior art devices, other non-tracer gases had the ability to set-off the detector.

Accordingly, it is desirable to provide an efficient method and apparatus to be able to determine air flow within an air pipe. It is also desirable to provide a method apparatus that can leave a valve in an air pipe and take advantage of the pressurized line and accurately determine the location of the break in the air pipe or cable by using flow analyses techniques. Additionally, it is desirable to provide an open flow and restricted flow path in one apparatus.

SUMMARY OF THE INVENTION

In one aspect of the present invention, a multi-position valve operates between an open flow and a restricted flow position without the need for bypass plumbing or keying around a restricted airflow.

In another aspect of the present invention, a mechanism is provided to determine the current airflow within a conduit or air pipe by measuring pressure before a restrictor screen and after the restrictor screen.

The above is achieved through the use of a novel multi-position valve that is operable from the exterior with a lever as herein disclosed. In accordance with one embodiment of the present invention, an apparatus for measuring airflow includes an activation lever, a valve having an inlet and an outlet port. The valve is linked to the lever and shifts between a restricted flow and an open flow position. An additional element is an air restrictor positioned in the airflow when the valve is in the restricted flow position. To measure the pressure at the inlet and outlet port, pressure tap valves are located at the ports.

Prior to measuring the airflow, the airflow is first restricted by moving the activation lever into the restricted position. When the restricted flow is in place, the valve is positioned so that a restrictor plate is placed within the airflow. To restrict the airflow, a plurality of orifices are located on the restrictor plate.

In another embodiment of the present invention, a method for measuring airflow includes the steps of positioning a valve including an inlet and outlet port in a restricted airflow position, measuring the pressure at the inlet port and measuring the pressure at the outlet port. The method can also include the step of positioning the valve in an open position.

When the valve is placed in the restricted position, the method provides the step of measuring differential pressure and thereby determining the airflow through the valve. In this alternate embodiment, pressure tap valves are used to communicate the pressure differential external to the valve.

In another alternate embodiment of the present invention, an apparatus for measuring airflow includes means for selectively permitting flow which includes an inlet and outlet port, wherein the means for selectively permitting flow is configured to be placed in a restricted airflow position, means for measuring the pressure at the inlet port and means for measuring the pressure at the outlet port. To position the means for selectively permitting flow in the restricted airflow position and an open position, this alternate embodiment provides means for positioning the means for selectively permitting flow in a selected position.

Once the valve is placed in the restricted position, the present invention has means for determining the pressure differential between the inlet and the outlet ports. In this embodiment, a pressure tap valves are used to communicate this pressure differential to an external differential pressure gauge.

In another embodiment of the present invention, an apparatus for measuring airflow includes a valve having an inlet and an outlet port. The valve has a restricted position and an open position. A restrictor plate is located in the restricted position of the valve and a multi-position lever connected to the valve. This embodiment can also have a first pressure tap valve located at the inlet port and a second pressure tap valve located at the outlet port.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides a multi-positionable valve that operates between a restricted flow and open flow with a restrictor plate placed in the valve when the valve is placed in the restricted flow position. The preferred embodiment can be left within an air pipe or easily be placed within an air pipe an provide minimal amount of pressure drop when in an open flow position.

Figure 1:
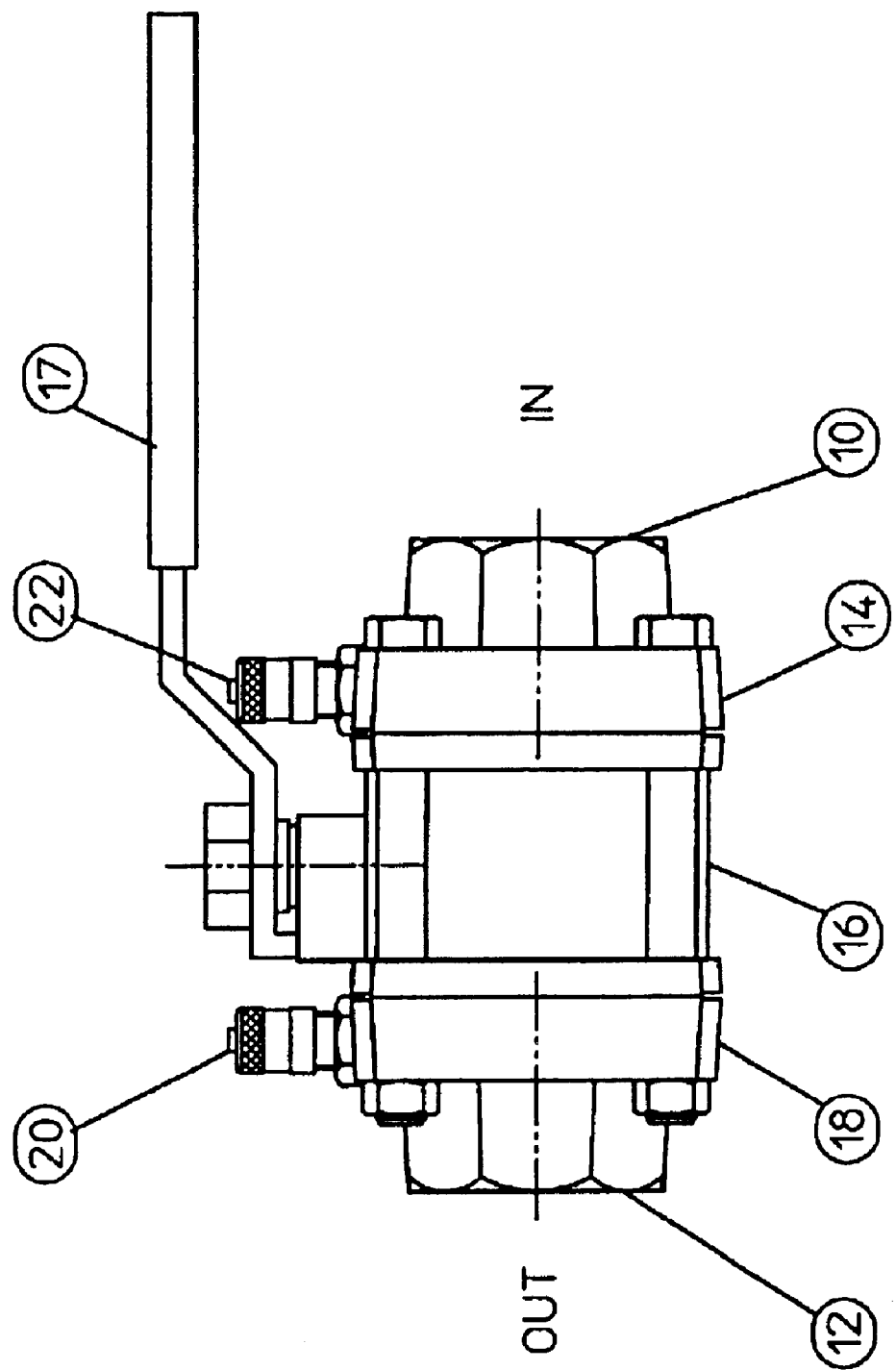
FIG. 1 is a side view of the present invention.

A preferred embodiment of the present inventive apparatus and method is illustrated in FIG. 1. FIG. 1 illustrates the side view of the preferred embodiment. The preferred embodiment contains a inlet port 10 and an outlet port 12. The preferred embodiment is placed in a pressured line, air pipe or conduit which inturn pressurizes the sheaths such as a telephone cables. The inlet port 10 is connected to one side of the conduit line while the outlet port 12 is connected to the other side of the conduit line.

Initially, the air flows through the line through the inlet port 10. The line is attached with a flange 14 to an interior portion 16 of the inlet port 10, where a multi-positionable valve is located. The valve, in the preferred embodiment, can be shifted to an open flow position and a restricted flow position. The valve is moved with an activation mechanism or lever 17. To move the valve to either of the positions, the lever 17 is shifted. The air exits the valve through an outlet port 12, which is attached to the interior portion with a flange 18.

Pressure tap valves 20, 22 are located on or about the flanges 14, 18. The pressure tap valve enables a user to measure the differential pressure within the conduit. The user is then able to determine the air flow by connecting a differential pressure gauge (external to the valve) to the pressure tap valves 20 and 22.

Figure 2:
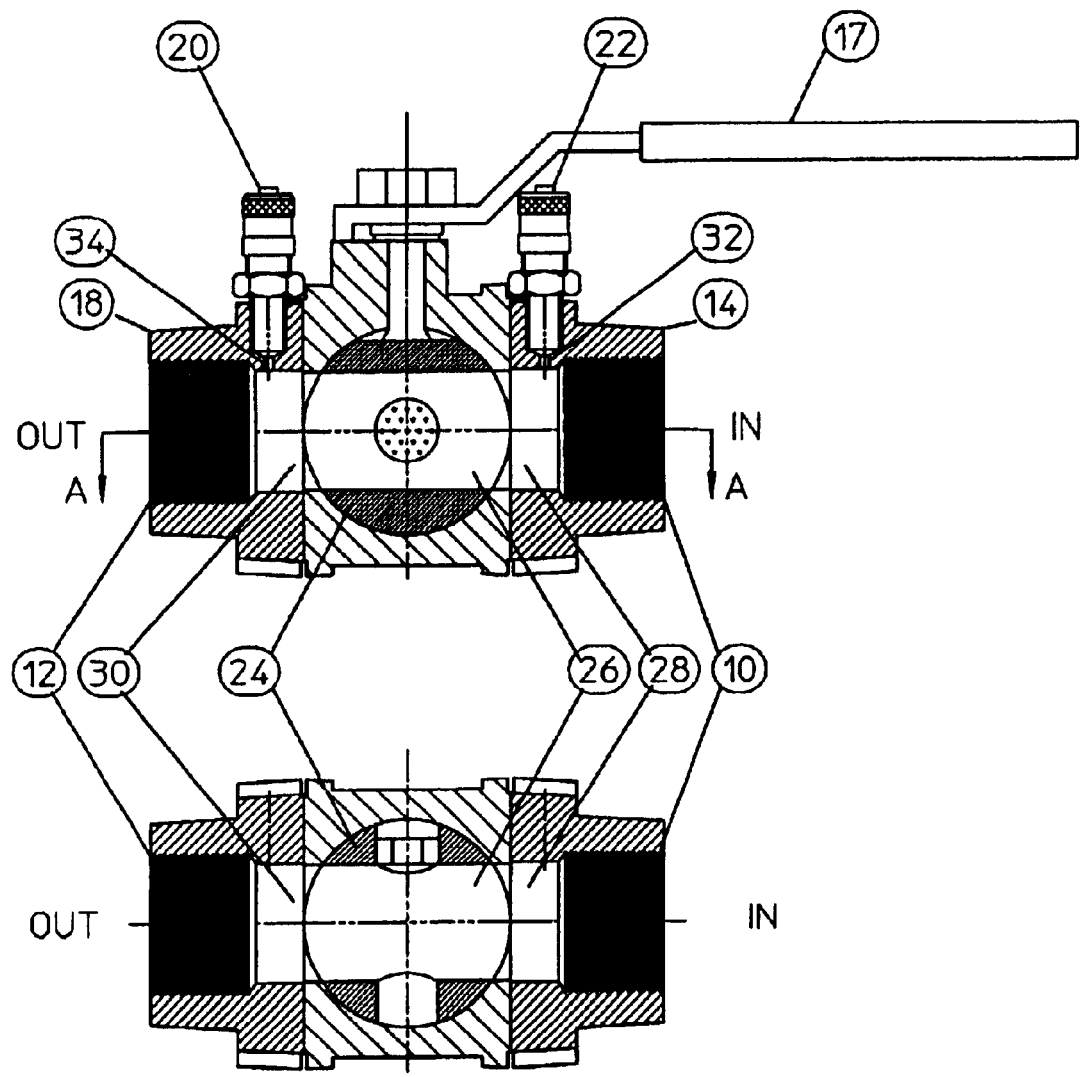
FIG. 2 is a cutout view of the interior portion of the invention when the invention is placed in the open flow position.

FIG. 2 is a cross sectional view of the preferred embodiment. The view illustrates the valve 24 in an open flow position. The valve 24, in the preferred embodiment, is a ball valve. With the ball valve 24 positioned in the open flow position by the lever 17, an unrestricted pathway 26 is created between the inlet port 10 and the outlet port 12.

In the open flow position, the pathway links the valve 24 with the flanges 14, 18. A ball valve seals the linkage between the valve 24 and the valve connection 28 and the flange 14. The ball valve additionally seals the linkage between the valve 24 and valve connection 30 on the outlet port 12.

The air flowing from the inlet port 10 to the outlet port 12 flows unrestricted. This means, absent a breakage in the conduit, the pressure is approximately the same when measured with pressure tap valves 20, 22.

The pressure tap valves 20, 22 attach to the flanges 14, 18. The pressure tap valves 20, 22 read the pressure through the openings 32, 34, which are created at the valve connection 28, 30 of the inlet and outlet ports 10, 12.

Figure 3:
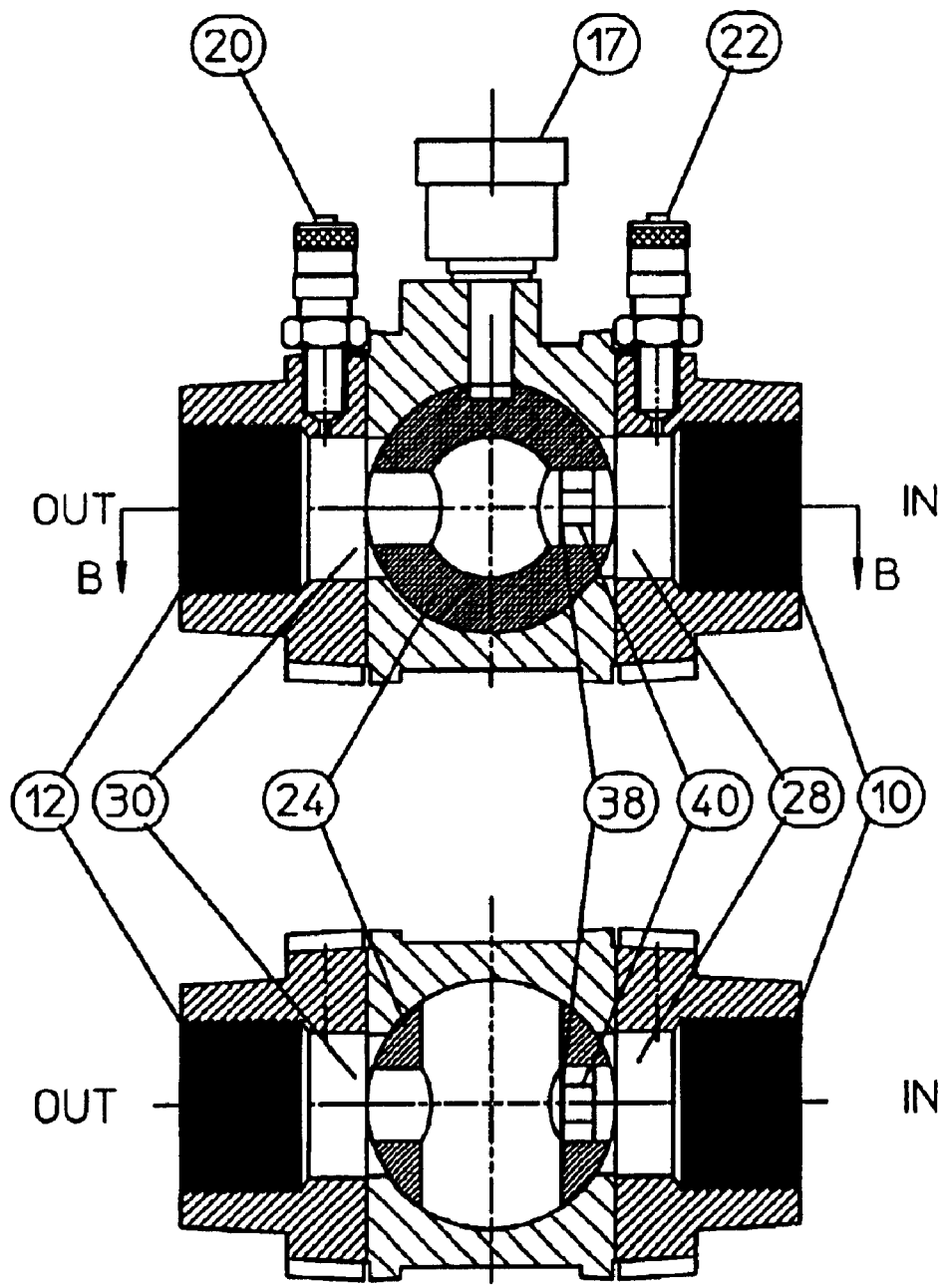
FIG. 3 is a cutout view of the interior portion of the invention when the invention is placed in the restricted flow position.

FIG. 3 is a cutout view of the interior portion of the invention when the invention is placed in the restricted flow position. In this instance, the lever 17, which is connected to the valve 24 is shifted to another location. By doing this, the valve 24 is rotated such that the restricted flow is now in the air flow path.

The restricted flow is created using a ball valve. The ball valve is closed such that nothing is allowed to pass through the valve. To close the valve, the lever 17 is moved to an alternate position.

In the preferred embodiment, a portion of closed section of the ball valve is cored on both sides of the inlet and outlet ports. In other words, an airflow path is created when the ball valve is placed in the closed position. The closed position, in the present invention, now becomes the restricted flow.

To restrict the flow of the air, the ball valve is cored such that the airflow path is less in diameter than that of the open flow. To further restrict the air, a screen or air restrictor 38 is placed between the flange connection 28 and the valve 24 and swaged in place by expanding the outside diameter of the air restrictor 38 outwardly into a tight engagement within the cored out walls of the valve 24. To further support the air restrictor 38, a spring clip or like device 40 is used to hold or fasten the screen in place. Without the spring clip or other attachment means, the screen 38 can move and provide a direct opening through the valve 24 through which the air would travel. In this instance, an alternate path is created for the air flow to travel. With movement of the screen 38, a less restricted path is created and result in an incorrect air flow reading.

Figure 4:
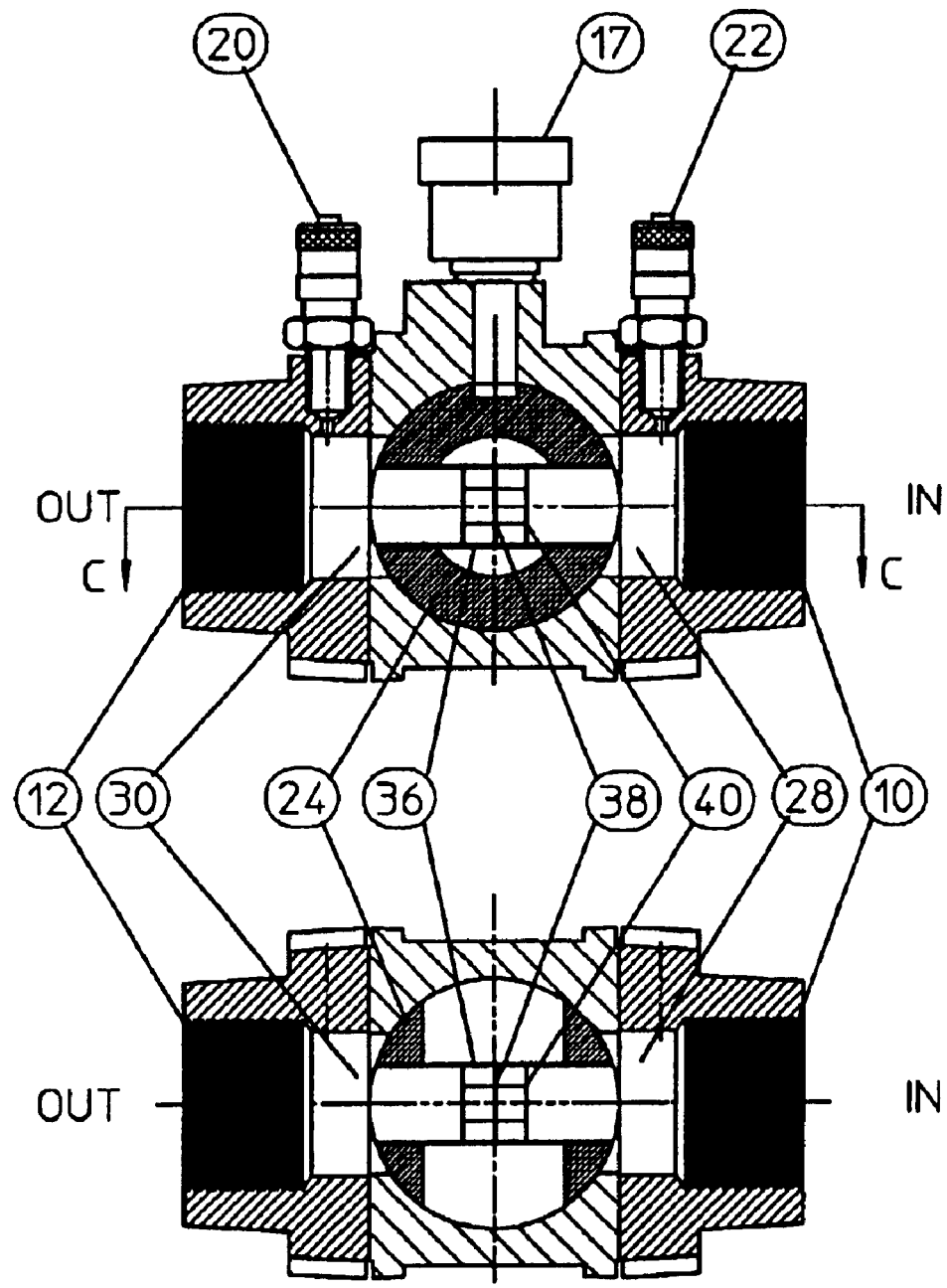
FIG. 4 is an alternate embodiment of the present invention.

FIG. 4 is an alternate embodiment of the present invention. This figure illustrates the present invention in a restricted flow position. A piece of air tubing 36 is placed between the flange connections 28, 30 and through the cored valve 24 pathway. To further restrict the air, a screen or air restrictor 38 is placed in the center of the air tubing 36 and swaged in place by expanding the outside diameter of the air restrictor 38 outwardly into a tight engagement within inner walls of the air tubing 36. This embodiment positions restrictor plate 38 in the center of the pressure tap valves 22, 20 as opposed to being offset in the other embodiments. To further support the air restrictor 38, a spring clip or like device 40 is used to hold or fasten the screen in place from both sides.

Figure 5:
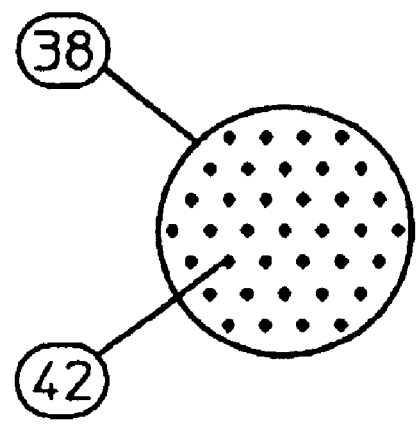
FIG. 5 illustrates the restricted plate incorporated in the present invention.

FIG. 5 provides an illustration of the screen 38. The screen is a flat circular plate positioned transversely to the flow of air through the inlet port 10 with such screen 28 being provided with a plurality of uniform and uniformly spaced openings 42 extending therethrough. The openings 42 are uniformly spaced in rows in all directions so that all openings 42 are equidistant from each other. The openings 42 extend in such uniform spacing completely throughout the area of the screen 38 exposed to the air flow to provide both a radially uniform restriction to and appropriately sized individual passages for the air flow through the conduit and inlet port 10. Each opening 42 is surrounded by a hexagon of six equidistant and equally spaced apertures and that this pattern exists at all locations within the entire orifice plate surface exposed to the air flow.

The screen 38 is designed to introduce a slight resistance to the flow of air or gas is placed within the conduit through which the air is flowing. The difference between the pressures appearing at the wall of the conduit sections upstream and downstream of the flow impeding device is measured. The magnitude of that pressure difference is directly utilized to determine the amount of air (in standard cubic feet per hour, SCFH, for example) flowing through the conduit (i.e., the greater the pressure differential, the greater the flow). In its simplest form, the flow impeding device is a thin plate mounted perpendicularly to the axis of the pipe, in such a manner as to prevent the flow of air except such air as may flow through an orifice machined in the plate.

When the valve 24 is positioned to the restricted flow position, the user, in the preferred embodiment, allows the pressure to settle and then determine the air flow or pressure reading from the pressure valves 20, 22. The pressure reading is obtained prior to the screen from pressure tap valve 20. The pressure is also obtained from the pressure tap valve 22 after the air flow passed through screen 38. The differential rate between the measurements is the flow rate. To automatically determine the flow rate, the preferred embodiment uses a calibrated differential pressure gauge connected to pressure valves 20, 22 positioned upstream and downstream of the disk. The gauge senses the pressure and translates this into a flow reading.

The benefit of the using a screen 28 with a plurality of the openings 42 is that the screen 38 provides a less restrictive differential pressure. By implementing the screen 38 in such a fashion, a more sensitive differential gauge that would measures the air flow. The air flow rate indicates as to whether there is unusual pressure drop after the screen 38. If the pressure drop is outside, the norm, this is indication to technician that there is a leak or break in the conduit. The pressure differential across the screen 38 indicates the approximate location of the leak or break. For example, a large pressure differential is indicative of leak within the approximate area.

The benefit of the present invention is ability to have a single device that can be moved from an open flow position to a restricted position. A screen 38 can be placed in the line and the pressure measured before and after the screen 38. However, if the screen 38 is left in the pipe and high volume of airflow is needed to maintain air pressure, a tremendous loss of pressure occurs downstream of the disk. As the air flow increases, the pressure begins to drop increasingly in a non-linear fashion. If multiple screens 38 are left in the line, the pressure drops substantially farther down the pipe. In some instances, the pressure is insubstantial.

One solution to this device is to place a shutoff valve located at the inlet and outlet ports. A air pipe is then placed in parallel with the screen 38. This creates a bypass path around the screen 38. However, this becomes cumbersome and bulky and not easy to install where space is usually limited.

One of the benefits of the present invention is that it overcomes this problem by including the screen 38 inside a oversized shutoff ball valve. The closed portion of the ball is bored out to receive the screen 38. In the traditional ball valve's closed position, the screen 38 is "in line" with the air flow so that a reading can be taken using differential pressure gauge. After a reading is taken, the ball valve can be placed in the open position. In the open position, air flows through the unrestricted port opening. When comparing to the internal diameter of the air pipe, there is very little difference in pressure loss. As a result, a number of these valves 24 can be placed in the line with little pressure loss.

Another benefit is that the present invention can be placed into an existing conduit with ease. Therefore, upon laying conduit, the present invention can be placed at intervals along the pipe. A technician only has to visit the location of the present invention and determine the reading.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for measuring airflow, comprising:
   an activation lever;
   a valve comprising an inlet and an outlet port, the valve is linked to the lever and shifts between a restricted flow and an open flow position; and
   an air restrictor associated with the valve and being positioned in the airflow when the valve is in the restricted flow position and being positioned away from the airflow when the valve is in the open flow position, wherein the airflow is determined by taking measurements on both sides of the restrictor while in the restricted flow position.

2. The apparatus as in claim 1, further comprising a first measuring port attached to the inlet port.

3. The apparatus as in claim 1, further comprising a second measuring port attached to the outlet port.

4. The apparatus as in claim 1, further comprising a first measuring port attached to inlet port and a second measuring port attached to the outlet port.

5. The apparatus as in claim 4, wherein the first and second measuring ports are pressure tap valves.

6. The apparatus as in claim 1, wherein the air restrictor is a cylindrical screen.

7. The apparatus as in claim 6, wherein the cylindrical screen comprises a plurality of orifices.

8. The apparatus as in claim 7, wherein the plurality of orifices are approximately the same size.

9. The apparatus as in claim 1, wherein the valve is a ball valve.

10. A method for measuring airflow, comprising:
    positioning a valve comprising an inlet and outlet port in a restricted airflow position;
    providing restricted airflow through an air restrictor in the restricted airflow position;
    providing unrestricted airflow by moving the air restrictor away from the airflow in an unrestricted airflow position;
    measuring the pressure at the inlet port; and
    measuring the pressure at the outlet port.

11. The method as in claim 10, further comprising positioning the valve in the open position.

12. The method as in claim 10, further comprising determining pressure the differential between the inlet valve and the outlet valve.

13. The method as in claim 10, wherein the steps of measuring the airflow at the inlet and outlet ports comprises placing a pressure tap valve at the inlet and outlet ports.

14. The method as in claim 10, wherein the valve further comprises an airflow restrictor that is positioned in the valve to restrict the airflow.

15. The method as in claim 14, wherein the restrictor is a screen.

16. An apparatus for measuring airflow, comprising:
   means for selectively permitting flow comprising an inlet and outlet port, wherein the means for selectively permitting flow is configured to be placed in a restricted airflow position;
   means for providing restricted airflow through an air restrictor in the restricted airflow position;
   means for providing unrestricted airflow by moving the air restrictor away from the airflow in an unrestricted airflow position;
   means for measuring the airflow at the inlet port; and
   means for measuring the airflow at the outlet port.

17. The apparatus as in claim 16, further comprising means for selectively permitting flow in an open position.

18. The apparatus as in claim 16, further comprising means for determining the pressure the differential between the inlet port and the outlet port.

19. The apparatus as in claim 16, wherein the means for measuring the airflow at the inlet and outlet ports comprises a pressure tap valve at the inlet and outlet ports.

20. The apparatus as in claim 16, wherein the valve further comprises means for restricting airflow restrictor positioned in the valve to restrict the airflow.

21. The apparatus as in claim 20, wherein means for restricting airflow is a screen.

22. An apparatus for measuring airflow, comprising:
   a valve comprising an inlet and an outlet port, the valve has a restricted position and a open position;
   a restrictor plate located in the airflow while in the restricted position of the valve and located away from the airflow when in the open position; and
   a multi-position lever connected to the valve, wherein airflow is determined by taking measurements on both sides of the restrictor plate while in the restricted position.

23. The apparatus as in claim 22, further comprising a first pressure tap valve located at the inlet port.

24. The apparatus as in claim 22, further comprising a second pressure tap valve located at the outlet port.

* * * * *